United States Patent
Drake et al.

(10) Patent No.: US 10,785,621 B1
(45) Date of Patent: Sep. 22, 2020

(54) SYSTEMS AND METHODS TO PROVIDE AN INTERACTIVE SPACE BASED ON VEHICLE-TO-VEHICLE COMMUNICATIONS

(71) Applicant: Disney Enterprises, Inc., Burbank, CA (US)

(72) Inventors: Corey D. Drake, Burbank, CA (US); Hunter Gibson, Burbank, CA (US); Jason Yeung, Burbank, CA (US); Michael P. Goslin, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/525,917

(22) Filed: Jul. 30, 2019

(51) Int. Cl.
*H04W 4/46* (2018.01)
*G06T 19/00* (2011.01)
(Continued)

(52) U.S. Cl.
CPC ............ *H04W 4/46* (2018.02); *G06F 3/011* (2013.01); *G06T 19/006* (2013.01);
(Continued)

(58) Field of Classification Search
CPC ...... H04W 4/46; H04W 4/021; G06T 19/006; G06F 3/011; G06F 3/012; G06F 3/017;
(Continued)

(56) References Cited

U.S. PATENT DOCUMENTS

| 1,004,331 A | 9/1911 | Wright |
| 1,004,624 A | 10/1911 | Brann |

(Continued)

FOREIGN PATENT DOCUMENTS

| IN | 1381KOL2007 | 4/2009 |
| JP | 2019065430 | 4/2019 |

(Continued)

OTHER PUBLICATIONS

Lambros Sarakis, et al., Technological Educational Institute of Sterea Ellada; Hellenic Open University; Synelixis Solutions Ltd., Providing Entertainment Applications in VANET Environments, Mar. 2, 2016 [https://ieeexplore.ieee.org/document/7422403] (8 pages).

(Continued)

*Primary Examiner* — Jaime M Holliday
(74) *Attorney, Agent, or Firm* — Esplin & Associates, PC

(57) ABSTRACT

This disclosure relates to systems and methods to provide an interactive space based on vehicle-to-vehicle communications. A vehicle may store experience information and/or other information. The experience information may define virtual content to be presented to a user residing in the vehicle to create an interactive space. The virtual content may be associated with an experience location in a real-world environment. Responsive to a vehicle location of the vehicle being at or near the experience location, the user may be presented with views of the virtual content. The user may interact with the virtual content causing an update of the experience information. Upon detection of presence of a second vehicle, the vehicle may communicate the updated experience information to the second vehicle.

16 Claims, 7 Drawing Sheets

(51) Int. Cl.
  *G06F 3/01* (2006.01)
  *H04W 4/021* (2018.01)
  *B60R 1/00* (2006.01)
  *G01C 21/36* (2006.01)
  *H04L 29/08* (2006.01)

(52) U.S. Cl.
  CPC .............. *H04W 4/021* (2013.01); *B60R 1/00* (2013.01); *B60R 2300/207* (2013.01); *B60R 2300/302* (2013.01); *G01C 21/3647* (2013.01); *G06F 3/012* (2013.01); *G06F 3/017* (2013.01); *H04L 67/12* (2013.01)

(58) Field of Classification Search
  CPC .............. B60R 1/00; B60R 2300/207; B60R 2300/302; G01C 21/3647; H04L 67/12
  See application file for complete search history.

(56) References Cited

U.S. PATENT DOCUMENTS

| | | | |
|---|---|---|---|
| 5,299,291 A | 3/1994 | Ruetz | |
| 5,766,077 A | 6/1998 | Hongo | |
| 6,053,815 A | 4/2000 | Hara | |
| 6,200,138 B1 | 3/2001 | Ando | |
| 6,691,032 B1 | 2/2004 | Irish | |
| 7,081,033 B1 | 7/2006 | Mawle | |
| 7,266,847 B2 | 9/2007 | Pauker | |
| 7,739,371 B2 | 6/2010 | Ikegaya | |
| 7,837,544 B2 | 11/2010 | Tipping | |
| 8,190,295 B1 | 5/2012 | Garretson | |
| 8,758,126 B2 | 6/2014 | Bavitz | |
| 8,831,228 B1 | 9/2014 | Agrawal | |
| 8,882,595 B2 | 11/2014 | Chowdhary | |
| 8,894,462 B2 | 11/2014 | Leyland | |
| 8,941,690 B2 | 1/2015 | Seder | |
| 8,988,465 B2 | 3/2015 | Baron | |
| 9,007,400 B2 | 4/2015 | Takahashi | |
| 9,008,310 B2 | 4/2015 | Nelson | |
| 9,266,018 B2 | 2/2016 | Story | |
| 9,293,042 B1 | 3/2016 | Wasserman | |
| 9,327,189 B2 | 5/2016 | Bavitz | |
| 9,361,730 B2 | 6/2016 | Keating | |
| 9,610,510 B2 | 4/2017 | Comploi | |
| 9,643,086 B2 | 5/2017 | Tipping | |
| 9,669,302 B2 | 6/2017 | Park | |
| 9,715,764 B2 | 7/2017 | Alaniz | |
| 9,744,448 B2 | 8/2017 | Mullen | |
| 9,814,991 B2 | 11/2017 | Van Winkle | |
| 9,821,920 B2 | 11/2017 | Cole | |
| 9,922,466 B2 | 3/2018 | Donnelly | |
| 10,019,070 B2 | 7/2018 | Szczerba | |
| 10,025,431 B2 | 7/2018 | Li | |
| 10,059,347 B2 | 8/2018 | Thieberger-Navon | |
| 10,140,464 B2 | 11/2018 | Lebeck | |
| 10,162,998 B2 | 12/2018 | Park | |
| 10,310,600 B2 | 6/2019 | Hong | |
| 10,339,711 B2 | 7/2019 | Ng-Thow-Hing | |
| 10,366,290 B2 | 7/2019 | Wang | |
| 10,376,776 B2 | 8/2019 | Lowe | |
| 10,585,471 B2 | 3/2020 | Reichow | |
| 10,589,625 B1 | 3/2020 | Goslin | |
| 2003/0027636 A1 | 2/2003 | Covannon | |
| 2003/0130031 A1 | 7/2003 | Yoshida | |
| 2004/0059922 A1 | 3/2004 | Harris | |
| 2005/0059483 A1 | 3/2005 | Borge | |
| 2006/0052153 A1 | 3/2006 | Vlazny | |
| 2006/0224456 A1 | 10/2006 | Walker | |
| 2006/0277100 A1 | 12/2006 | Parham | |
| 2007/0087834 A1 | 4/2007 | Moser | |
| 2007/0093299 A1 | 4/2007 | Bergeron | |
| 2007/0139671 A1 | 6/2007 | Stevens | |
| 2007/0197275 A1 | 8/2007 | Gagner | |
| 2008/0105751 A1 | 5/2008 | Landau | |
| 2008/0148067 A1 | 6/2008 | Sitrick | |
| 2008/0200244 A1 | 8/2008 | Rowe | |
| 2008/0309010 A1 | 12/2008 | Bowling | |
| 2008/0311983 A1 | 12/2008 | Koempel | |
| 2009/0069084 A1 | 3/2009 | Reece | |
| 2009/0079705 A1 | 3/2009 | Sizelove | |
| 2009/0137323 A1 | 5/2009 | Fiegener | |
| 2009/0176566 A1 | 7/2009 | Kelly | |
| 2009/0313358 A1 | 12/2009 | Shepherd | |
| 2010/0033427 A1 | 2/2010 | Marks | |
| 2010/0093421 A1 | 4/2010 | Nyman | |
| 2010/0098092 A1 | 4/2010 | Luo | |
| 2010/0130296 A1 | 5/2010 | Ackley | |
| 2010/0182340 A1 | 7/2010 | Bachelder | |
| 2010/0324984 A1 | 12/2010 | Pelto | |
| 2010/0331721 A1 | 12/2010 | Epley | |
| 2011/0098092 A1 | 4/2011 | Reiche, III | |
| 2011/0183754 A1 | 7/2011 | Alghamdi | |
| 2011/0216948 A1 | 9/2011 | Yalla | |
| 2012/0089275 A1 | 4/2012 | Lee | |
| 2012/0142415 A1 | 6/2012 | Lindsay | |
| 2012/0256945 A1 | 10/2012 | Kidron | |
| 2012/0264518 A1 | 10/2012 | Rouille | |
| 2012/0289122 A1 | 11/2012 | Elliott | |
| 2012/0295703 A1 | 11/2012 | Reiche | |
| 2012/0295704 A1 | 11/2012 | Reiche | |
| 2013/0083003 A1 | 4/2013 | Perez | |
| 2013/0083061 A1* | 4/2013 | Mishra ............... | H04N 5/265 345/633 |
| 2013/0157607 A1 | 6/2013 | Paek | |
| 2013/0166147 A1 | 6/2013 | Chudzinski | |
| 2013/0274024 A1 | 10/2013 | Geylik | |
| 2013/0296058 A1 | 11/2013 | Leyland | |
| 2014/0067208 A1 | 3/2014 | Klappert | |
| 2014/0100020 A1 | 4/2014 | Carroll | |
| 2014/0100029 A1 | 4/2014 | Reiche | |
| 2014/0128144 A1 | 5/2014 | Bavitz | |
| 2014/0128145 A1 | 5/2014 | Hwang | |
| 2014/0162785 A1 | 6/2014 | Reiche | |
| 2014/0274313 A1 | 9/2014 | Bala | |
| 2014/0295963 A1 | 10/2014 | Ishikawa | |
| 2014/0342790 A1 | 11/2014 | Kim | |
| 2015/0003609 A1 | 1/2015 | Nelson | |
| 2015/0024852 A1 | 1/2015 | Pacey | |
| 2015/0065237 A1 | 3/2015 | Hohn | |
| 2015/0080125 A1 | 3/2015 | Andre | |
| 2015/0097864 A1 | 4/2015 | Alaniz | |
| 2015/0145671 A1 | 5/2015 | Cohen | |
| 2015/0174479 A1 | 6/2015 | Reiche | |
| 2015/0202962 A1 | 7/2015 | Habashima | |
| 2015/0294505 A1 | 10/2015 | Atsmon | |
| 2015/0346722 A1 | 12/2015 | Herz | |
| 2016/0042607 A1 | 2/2016 | McCoy | |
| 2016/0071397 A1 | 3/2016 | Logan | |
| 2016/0096114 A1 | 4/2016 | Van Winkle | |
| 2016/0189444 A1 | 6/2016 | Madhok | |
| 2016/0199730 A1 | 7/2016 | Olson | |
| 2016/0206955 A1 | 7/2016 | Goslin | |
| 2016/0206957 A1 | 7/2016 | Goslin | |
| 2016/0299567 A1 | 10/2016 | Crisler | |
| 2016/0310839 A1 | 10/2016 | Leyland | |
| 2016/0313792 A1 | 10/2016 | Siegel | |
| 2016/0346704 A1 | 12/2016 | Wagner | |
| 2017/0021273 A1* | 1/2017 | Rios ..................... | A63F 13/332 |
| 2017/0021282 A1 | 1/2017 | Comploi | |
| 2017/0045946 A1 | 2/2017 | Smoot | |
| 2017/0050743 A1 | 2/2017 | Cole | |
| 2017/0068311 A1 | 3/2017 | Evans | |
| 2017/0072316 A1 | 3/2017 | Finfter | |
| 2017/0103571 A1* | 4/2017 | Beaurepaire ....... | G01C 21/3667 |
| 2017/0106288 A1 | 4/2017 | Reiche | |
| 2017/0132334 A1 | 5/2017 | Levinson | |
| 2017/0166221 A1 | 6/2017 | Osterman | |
| 2017/0330034 A1 | 11/2017 | Wang | |
| 2017/0352185 A1* | 12/2017 | Bonilla Acevedo ........ | G02B 27/0179 |
| 2018/0040162 A1 | 2/2018 | Donnelly | |
| 2018/0040163 A1 | 2/2018 | Donnelly | |
| 2018/0043272 A1 | 2/2018 | Van Winkle | |
| 2018/0089901 A1 | 3/2018 | Rober | |

(56) References Cited

U.S. PATENT DOCUMENTS

| | | | |
|---|---|---|---|
| 2018/0231973 A1 | 8/2018 | Mattingly |
| 2019/0065970 A1 | 2/2019 | Bonutti |
| 2019/0075437 A1 | 3/2019 | Shaikh |
| 2019/0101976 A1 | 4/2019 | Reichow |
| 2019/0157607 A1 | 5/2019 | Kim |
| 2019/0220674 A1 | 7/2019 | Khalfan |
| 2020/0053400 A1 | 2/2020 | Chao |

FOREIGN PATENT DOCUMENTS

| | | | |
|---|---|---|---|
| WO | 2007101785 A1 | 9/2007 |
| WO | 2018128946 A1 | 7/2018 |

OTHER PUBLICATIONS

Raman Mehta, IDG Communications, Inc., Augmented Reality—Next Frontier for Competitive Advantage, Feb. 14, 2017 [https://www.cio.com/article/3169685/augmented-reality-next-frontier-for-competitive-advantage.html], (5 pages).

Adam Hartley, 5 Predictions for the Future of in-Car Entertainment, Apr. 9, 2019 [https://360.here.com/5-predictions-for-the-future-of-in-car-leisure-entertainment], (5 pages).

"Battle Circuit", Capcom, available at «https://web.archive.org/web/20000111 073021 /http://www.capcom.co.jp/newproducts/arcade/battle/bs-top. html» (Orig in al Japanese web page followed by English translation), 4 pages.

"Sun CriesSun Cries", http://web.archive.org, Mar. 9, 2012 (Mar. 9, 2012), XP055152538, Retrieved from the Internet: URL: http://web.archive.org/web/20120309212642/http://www.suncries.com/skylanders-hac king [retrieved on Nov. 12, 2014] (8 pgs).

"Video Game/ Battle Circuit", TV Tropes, available at «https://web.archive.org/web/20150114005112/http://tvtropes.org/pmwiki/pmwiki .php/VideoGameBattleCircuit» (4 pages).

Dagamant, 'Skylanders Hacking', Retrieved from the Internet http://web.archive.ora/web/20120309212642/http://www,suncries.com/skvlaners-hack ing Feb. 27, 2012, XP055152538, 8 pages.

Extended European Search Report issued in European Patent Application No. 14175300.4, dated Nov. 19, 2014. (6 pgs).

Kloster, Benjamin, 'Wanted: Encryption Scheme for Copy Protection Purposes', Retrieved from the Internet http://stackoverflow.com/questions/14529732/wanted-encrYption-scheme-for-copy-protection-purposes, Jan. 25, 2013, XP055152568, 2 pages.

Apple (Developing Wireless CarPlay System, https://developer.apple.com/videos/play/wwdc2017/717/WWDC 2017, video and slide). (Year: 2017).

* cited by examiner

SYSTEMS AND METHODS TO PROVIDE AN INTERACTIVE SPACE BASED ON VEHICLE-TO-VEHICLE COMMUNICATIONS

FIELD

This disclosure relates to systems and methods to provide an interactive space based on vehicle-to-vehicle communications.

BACKGROUND

Communication between vehicles may facilitate an increase in on-road safety and accuracy in the self-driving systems of autonomous vehicles. Various communications techniques exist. One technique may be through networking such as sending information to a server and relaying that information to vehicles. Another technique referred to as "vehicle-to-vehicle" communication may not require a central server. Instead, vehicle-to-vehicle communication may allow cars to communicate directly with each other over a dedicated Wi-Fi band and/or other communication scheme. Vehicles may communicate information about their position, speed, and/or other information when they become physically close to one another.

SUMMARY

This disclosure relates to systems and methods to provide an interactive space based on vehicle-to-vehicle communications. An interactive space may include one or both of an augmented reality (AR) environment, a virtual reality (VR) environment, and/or other interactive spaces. An augmented reality environment may include views of images forming virtual content superimposed over views of the real world. A virtual reality environment may include views of images forming virtual content within a virtual environment. The terms "space" and "environment" in the context of virtual reality and/or augmented reality may be used interchangeably herein. Virtual content may include one or more of virtual objects, virtual worlds, and/or other virtual content.

An implementation of the system may be at least partially coupled to, or included in, a vehicle. The vehicle may be configured to freely traverse over a terrain. For example, the vehicle may not be coupled to a rail and/or track. The vehicle may include a passenger vehicle and/or other vehicle configured to transport people. The passenger vehicle may be self-propelled (e.g., a sedan, a truck, a bus, and/or other vehicles), attached to an engine (e.g., a train, trolley, tug or similar vehicle), or may be coasting or ballistic (e.g., an orbiting, falling or coasting vehicle). The vehicle may be an autonomous vehicle.

The disclosure presents techniques to create shared experiences between users in different vehicles without the need for a robust network, server, and/or an active connection to the Internet. As a user/player in a vehicle (human driven or self-driven) affects their local version of the interactive space in some way (e.g., making changes to the interactive space), other vehicles may sync up on those changes using existing vehicle-to-vehicle communication once those over vehicles come into physical proximity to the vehicle.

A system configured to provide an interactive space based on vehicle-to-vehicle communications may include one or more of one or more physical processors, one or more client devices, one or more vehicle sensors, and/or other components. The system may be coupled to a vehicle. A client device may be configured to be installed, e.g., worn, on a head of a user. The client device may be configured to present images of virtual content to the user of the client device such that the user perceives the virtual content as being physically present in the real world.

In some implementations, the one or more processors may be configured by machine-readable instructions. The machine-readable instructions may include one or more computer program components. The computer program components may include one or more of an experience component, a location component, a presentation component, a communication component, an input component, and/or other components.

The experience component may be configured to obtain experience information and/or other information. The experience information may define virtual content to be presented to a user residing in a vehicle to create an interactive space. The virtual content may be associated with an experience location in a real-world environment.

The location component may be configured to obtain location information and/or other information. The location information may convey vehicle location of the vehicle in the real-world environment.

The presentation component may be configured to, responsive to the vehicle location being at or near the experience location, effectuate presentation of images of the virtual content on a client device associated with the user.

The input component may be configured to obtain input information and/or other information. The input component may convey user input via the client device. The user input may reflect user interaction with the virtual content.

The input component may be configured to update the experience information based on the input information and/or other information.

The communication component may be configured to detect presence of a second vehicle.

The communication component may be configured to effectuate communication of the experience information from the vehicle to the second vehicle.

The second vehicle may be similarly configured as the vehicle. A communication component of one or more processors of the second vehicle may be configured to obtain the experience information from the vehicle. A presentation component of the one or more processors of the second vehicle may be configured to, responsive to a second vehicle location of the second vehicle being at or near the experience location, effectuate presentation of images of the virtual content on a second client device associated with a second user in the second vehicle. The virtual content shown to the second user may reflect the prior user interaction.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. The drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
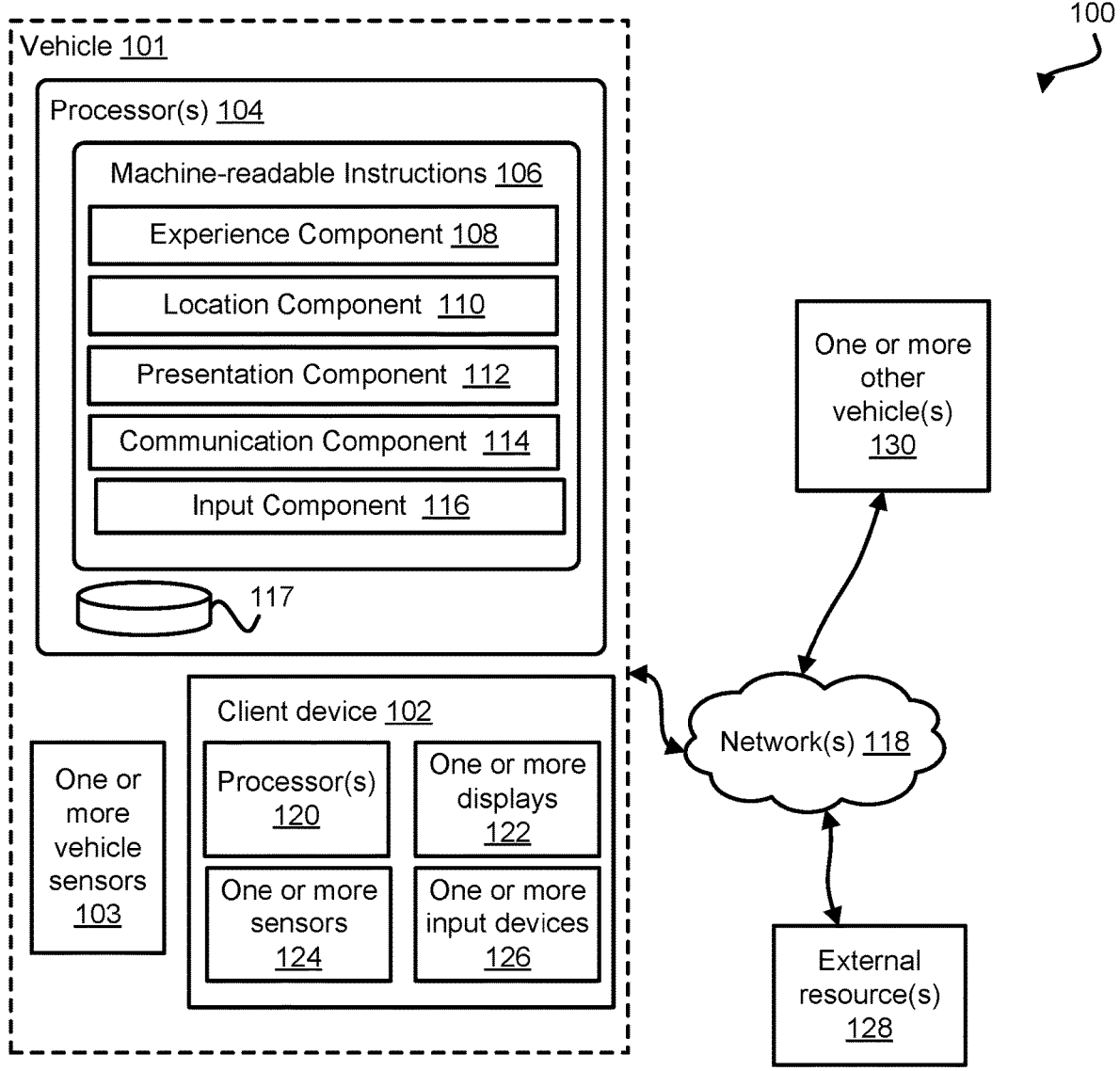
FIG. 1 illustrates a system configured to provide an interactive space based on vehicle-to-vehicle communications, in accordance with one or more implementations.

FIG. 1 illustrates a system 100 configured to provide an interactive space based on vehicle-to-vehicle communications. The system 100 may be at least partially coupled to, or included in, a vehicle (not shown in FIG. 1). The vehicle may be configured to freely traverse over a terrain. For example, the vehicle may not be coupled to a rail and/or track. The vehicle may include a passenger vehicle. The passenger vehicle may be self-propelled (e.g., a sedan, a truck, a bus, and/or other vehicles), attached to an engine (e.g., a train, trolley, tug or similar vehicle), may be coasting or ballistic (e.g., an orbiting, falling or coasting vehicle), may be human drive, and/or may be autonomous. In some implementations, the vehicle may be an aerial transport vehicle, such as an airplane, helicopter, etc.

An interactive space may include one or more of an augmented reality (AR) environment, a virtual reality (VR) environment, and/or other interactive spaces. An augmented reality environment may include views of images forming virtual content superimposed over views of the real world. A virtual reality environment may include views of images forming virtual content within a virtual environment. The terms "space" and "environment" in the context of virtual reality and/or augmented reality may be used interchangeably herein. Virtual content may include one or more of virtual objects, simulated spaces, and/or other virtual content.

An interactive space may include various content. Such content may include one or more of visual content, audio content, haptic content, and/or other content. The visual content may be in the form of images of virtual content. The virtual content may include one or more of a simulated space, virtual objects present in and/or moving through the simulated space, and/or other virtual content.

The content of the interactive space may be associated with one or more experience types. The one or more experience types may include one or more of a narrative-type experience for telling stories, a game-type experience for gameplay, and/or other types of experiences.

The system 100 may facilitate a shared experience between users in different vehicles without the need for a robust network, server, and/or an active connection to the Internet. As a user/player in a vehicle (human driven or self-driven) affects their local version of the interactive space in some way (e.g., making changes to the interactive space), other vehicles may sync up on those changes using existing vehicle-to-vehicle communication when those other vehicles come into physical proximity to the vehicle. In some implementations, different users may experience the interactive space synchronously and/or asynchronously.

The system 100 may include one or more of a vehicle 101, a client device 102, one or more vehicle sensors 103, one or more physical processors 104, one or more other vehicles 130, and/or other components. Some or all components of system 100 may be installed in vehicle 101 and/or otherwise coupled with vehicle 101. Some or all of components of system 100 may be installed in a device worn by a user in vehicle 101 and/or be otherwise coupled with a device worn by a person in vehicle 101. By way of non-limiting illustration, client device 102 may be configured to be worn on a head of a user in vehicle 101. In some implementations, client device 102 may include one or more physical processor 120 that may be the same as or similar to one or more physical processors 104. It is noted that although one or more describes of features and/or functions of system 100 may be directed to vehicle 101, this is for illustrative purposes only and not to be considered limiting. Instead, it is to be understood that individual ones of one or more other vehicles 130 may be configured similar to, and/or may include the same or similar components as, vehicle 101.

The one or more vehicle sensors 103 may be installed in vehicle 101 and/or be otherwise coupled with vehicle 101. The one or more vehicle sensors 103 may include one or more of one or more image sensors, one or more location sensors, depth and/or proximity sensors, and/or other sensors.

In some implementations, an image sensor may be configured to generate output signals conveying image information. Image information may define images of the real world. Image information may specify visual content within a field of view of the image sensor. The visual content may include real-world objects and/or surfaces present in the real world. The image information may specify visual content in the form of pixels in an image. Pixels may be defined by one or more of location (e.g., two-dimensional coordinates), color, transparency, and/or other information. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, monocular and/or stereo cameras, and/or other image sensors.

The image information may be used to determine presence information and/or other information. The presence information may include indications of presence of real-world objects (e.g., buildings, people, one or more other vehicles 130, etc.) within a range of an image sensor and/or identification of real-world objects. Detection of presence and/or identification of objects may be performed using one or more image-processing techniques (see, e.g., location component 110). One or more image processing techniques may include one or more of bundle adjustment, speeded up robust features (SURF), scale-invariant feature transform (SIFT), computer vision, and/or other techniques.

In some implementations, a location sensor may be configured to generate output signals conveying location information and/or other information. Location information may include location of the location sensor (and/or vehicle 101 including the location sensor) within the real-world environment. In some implementations, a location sensor may comprise a global position system (GPS), and/or other location sensing devices. The location sensor may be included in a navigation system (not shown) of vehicle 101.

In some implementations, a depth and/or proximity sensor may be configured to generate output signals conveying one or more of depth information, presence information, and/or other information. Depth information may include distance and/or range of real-world surfaces and/or objects from the sensor, and/or other information. In some implementations, depth information may be provided in the form of a point cloud. A point cloud may include a set of points. Individual points may represent individual surfaces within the real world. The depth information may specify, for individual points, one or more of an individual distance of the point from the depth sensor, an individual position and/or direction of the point with respect to the depth sensor, and/or other information. In some implementations, a depth and/or proximity sensor may comprise one or more of a time-of-flight sensor, a structured light sensor, an unstructured light sensor, an active stereo pair, a passive stereo pair, lidar, radar, and/or other depth and/or proximity sensing devices.

The client device 102 may be configured to present content to a user of client device 102. Client device 102 may present content one or more of visually, audibly, haptically, and/or in other ways. Client device 102 may include one or more of one or more physical processors 120, one or more displays 122, one or more sensors 124, one or more input devices 126, and/or other components.

The one or more displays 122 may be configured to present visual content. Visual content may include content that may be observed visually. Visual content may include one or more of an image, a video, and/or other visual content. In some implementations, the visual content may include images forming virtual content including a simulated space (see, e.g., experience component 108). The one or more displays 122 may part of a wearable headset. The one or more displays 122 include one or more of a head-mounted display (HMD), an optical head-mounted display, a see-through display, an optical see-through display, a video see-through display, a visor, eyeglasses, sunglasses, a computer, a laptop, a smartphone, a tablet, a mobile device, a projector, and/or other displays. In some implementations, one or more displays 122 may include a set of displays that present visual content to each eye individually as stereo image pairs. In some implementations, one or more displays 122 may include other devices or components not worn by a user. For example, in an implementation, one or more displays 122 may include components integrated into a vehicle. For example, windows of a vehicle may include or may be replaced with transparent or opaque displays.

In some implementations, one or more sensors 124 may be configured to generate output signals conveying viewpoint information and/or other information. The viewpoint information may define a position and/or heading of client device 102. The position and/or heading of client device 102 may characterize a viewpoint of a user of client device 102. Heading may be specified with respect to one or more degrees of freedom. By way of non-limiting illustration, heading may specify one or more of a pitch angle, roll angle, yaw angle, and/or other information. For example, client device 102 may be installed on the head of a user such that as the user changes their viewpoint (e.g., turns their head), the position and/or heading of the client device 102 will similarly follow. The one or more sensors 124 may include one or more of a position sensor, a heading sensor, and/or other sensors. By way of non-limiting illustration, one or more sensors 124 may include one or more inertial measurement units (IMU) and/or other sensors.

One or more user inputs may be received through one or more input devices 126. By way of non-limiting example, an input device may include a game controller (e.g., joystick and/or other game controller), a touch entry device, an imaging device, a sound device, motion entry device, and/or other input devices.

A touch entry device may include a device that allows a user to provide user inputs by touching an interface of the touch entry device. A touch entry device may include a separate device or a part of another device. For example, a touch entry device may include a touch screen coupled to client device 102 and/or a vehicle. A user may provide one or more user inputs by touching one or more portions of the touch entry device. For example, a user may provide one or more user inputs by touching one or more portions of the touch entry device corresponding to one or more of a trip destination, a distance of a trip, a duration of a trip, a location along a trip, and/or other information relating to a trip.

An imaging device may include a device that allows a user to provide user inputs by using an image sensor of the imaging device. An imaging device may include a separate device or a part of another device. For example, an imaging device may include an image sensor coupled to client device 102 and/or a vehicle. A user may provide one or more user inputs by performing gestures within a field of view of the imaging device. The image sensor may generate output signals conveying image information. The image information may define one or more images. Images may be defined by pixels. Pixels may be characterized by one or more of pixel location, pixel color, and/or other information.

A sound device may include a device that allows a user to provide user inputs through voice and/or sounds. A sound device may include a separate device or part of another device. For example, a sound device may include a microphone coupled to client device 102 and/or a vehicle.

In some implementations, a motion entry device may be disposed on one or more wearable articles and/or one or more handheld devices. By way of non-limiting example, in some implementations, a motion entry device may be included in and/or otherwise disposed on one or more gloves and/or other wearable articles and/or handheld device. User input may comprise gesture-based input. By way of non-limiting example, a user may perform hand gestures and/or other gestures while wearing the one or more gloves and/or holding a handheld device. The motion entry device may include one or more sensors configured to generate output signals conveying motion of the one or more sensors. User gestures may be derived from the motion.

In FIG. 1, electronic storage 117 of one or more physical processors 104 may include electronic storage media that electronically stores information. The electronic storage 117 may store software algorithms, information determined by one or more physical processors 104, information received remotely, and/or other information that enables system 100 to function properly.

In some implementations, electronic storage 117 may store one or more of trip information, experience information, and/or other information.

Trip information may characterize a planned trip of a vehicle. The trip may be characterized by one or more of anticipated locations of the vehicle along a trip, a distance to travel in a trip, a distance remaining in a trip, a duration traveled in a trip, a remaining expected duration of a trip, and/or other information.

The experience information may define virtual content to be presented to a user residing in the vehicle to create an interactive space (see, e.g., experience component 108). The virtual content may be associated with one or more experience locations in a real-world environment. In some implementations, an experience location may include a point in a real-world environment, an object in a real-world environment, a geo-fence, and/or other considerations. In some implementations, a geo-fence may comprise a virtual geographic boundary.

The one or more physical processors 104 may be configured to provide information processing capabilities in system 100. As such, one or more physical processors 104 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The one or more physical processors 104 may be configured by machine-readable instructions 106. The machine-readable instructions 106 may include one or more computer program components. The computer program components may include one or more of an experience component 108, a location component 110, a presentation component 112, a communication component 114, an input component 116, and/or other components.

The experience component 108 may be configured to obtain experience information and/or other information. The experience information may define visual content to be present to one or more users residing in a vehicle coupled to system 100. The visual content may be expressed through views of a virtual space. The experience component 108 may be configured to implement an instance of a virtual space executed by the computer components to determine state of the interactive space. The state may then be communicated (e.g., via streaming visual data, object/position data, and/or other state information) from one or more physical processors 104 to client device 102 for presentation to users. The state determined and transmitted to client device 102 may correspond to a viewpoint of a user of client device 102. The state determined and presented to client device 102 may correspond to a location in the virtual space and/or viewpoint of the user. The view described by the state for client device 102 may correspond, for example, to the location from which the view is taken, the location the view depicts, and/or other locations, a zoom ratio, a dimensionality of objects, a point-of-view, and/or parameters of the view. One or more of the view parameters may be selectable by the users.

An instance of the virtual space may comprise a simulated space that is accessible by users via clients (e.g., client device 102) that present the views of the virtual space to a user. The simulated space may have a topography, express ongoing real-time interaction by one or more users, and/or include one or more virtual objects positioned within the topography that are capable of locomotion within the topography. In some instances, the topography may be a 2-dimensional topography. In other instances, the topography may be a 3-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

The above description of the manner in which the state of the virtual space is determined by experience component 108 is not intended to be limiting. The experience component 108 may be configured to express the virtual space in a more limited, or richer, manner. For example, views determined for the virtual space representing the state of the instance of the virtual space may be selected from a limited set of graphics depicting an event in a given place within the interactive space. The views may include additional content (e.g., text, audio, pre-stored video content, and/or other content) that describes particulars of the current state of the place, beyond the relatively generic graphics. Other expressions of individual places within the interactive space are contemplated.

Within the instance(s) of the interactive space executed by experience component 108, users may control virtual objects, simulated physical phenomena (e.g., wind, rain, earthquakes, and/or other phenomena), and/or other elements within the interactive space to interact with the virtual space, other virtual objects, and/or other users. The virtual objects may include game entities such as avatars. As used herein, the term game entity may refer to a virtual object present in the interactive space that represents an individual user. A game entity may be controlled by the user with which it is associated. The user-controlled element(s) may move through and interact with the interactive space (e.g., non-user characters in the interactive space and/or other objects in the interactive space). The user-controlled elements controlled by and/or associated with a given user may be created and/or customized by the given user. The user may have an "inventory" of virtual items and/or currency that the user can use (e.g., by manipulation of a game entity or other user-controlled element, and/or other items) within the interactive space.

Control by users may be exercised through control inputs and/or commands input by the users through one or more input devices 126. The users may interact with each other through communications exchanged within the interactive space. Such communications may include one or more of textual chat, instant messages, private messages, voice communications, and/or other communications. Communications may be received and entered by the users. Communications may be routed to and from the appropriate users through one or more physical processors 104 and/or through communications which are external to the system 100 (e.g., text messaging services).

The instance of the virtual space may be persistent. That is, the virtual space may continue on whether or not individual users are currently logged in and/or participating in the interactive space. A user who logs out of the interactive space and then logs back in some time later may find the virtual space has been changed through the interactions of other users with the virtual space during the time the user was logged out. These changes may include changes to the simulated physical space, changes in the user's inventory, changes in other users' inventories, changes experienced by non-player characters, changes to the virtual items available for use in the interactive space, and/or other changes.

The experience component 108 may be configured to select content to present to a user to create the interactive space. The selected content may be based on a particular experience location associated with the content and/or a vehicle location of a vehicle being at or near the experience location.

In some implementations, experience component 108 may select content based on a planned location along a trip and/or other information. A location along a trip may refer to a location along one or more parts of a trip.

The location component 110 may be configured to obtain location information and/or other information. The location information may convey vehicle location of a vehicle in the real-world environment.

The presentation component 112 may be configured to determine whether a vehicle location of a vehicle is at or near an experience location associated with virtual content. In some implementations, being at or near an experience location including being within a geo-fence around the experience location. In some implementations, being at or near an experience location including being within a threshold distance from the experience location.

The presentation component 112 may be configured to, responsive to the vehicle location being at or near an experience location, effectuate presentation of images of virtual content associated with the experience location on client device 102 associated with one or more users in the vehicle. The presentation component 112 may be configured to effectuate presentation of content to a user via client device 102. By way of non-limiting illustration, experience component 108 may send commands, control signals, and/or other information to one or more displays 122.

The input component 116 may be configured to obtain input information and/or other information. The input location may convey user input via the client device 102 (e.g., one or more input devices 126). The user input may reflect user interaction with the virtual content. The user interaction may cause changes to the virtual content. The changes may include changes to a state of a virtual space and/or other changes.

The input component 116 may be configured to update experience information based on the input information and/or other information. The experience information may be updated to generate updated experience information. The updated experience may define the virtual content as reflected changes caused by the user interaction with the virtual content.

User interaction may be associated with a gameplay and/or a narrative type experience. User interaction with a gameplay type experience may include interaction that reflects gameplay. The gameplay may include one or more of engaging in battles, hiding and/or finding virtual objects (e.g., "Easter egg" hunts), building virtual objects, destroying virtual objects, interacting with non-player characters, interacting with other users' avatars, and/or other interaction in the context of playing a game. User interaction with a narrative type experience may include interactions that facilitate story telling. Interactions that facilitate story telling may include interacting with non-user entities to progress a story, responding to storytelling entities, and/or other interactions.

The communication component 114 may be configured to detect presence of one or more other vehicles 130. The detection of presence may be based on presence information and/or other information derived from output signals of one or more vehicle sensors 103.

The communication component 114 may be configured to effectuate communication of information to individual ones of one or more other vehicles 130. The information may include one or more of experience information, updated experience information, trip information, and/or other information. Communication may be effectuated via one or more communication interfaces of vehicle 101 (not shown in FIG. 1). The one or more communication interfaces may include one or more devices and/or software components configured to enable the exchange of information vehicles. By way of non-limiting illustration, the one or more communication interfaces may include a software and/or hardware interface. The one or more communication interfaces may include transceivers and/or other components configured to facilitate communication with one or more of wireless Bluetooth Low Energy (BLE), wired Universal Serial Bus (USB) connection, Wi-Fi, 5G network, and/or other connections. The one or more communication interfaces may facilitate vehicle-to-vehicle communication without the use of a central server and/or active connection to Internet.

In some implementations, the communication component 114 may be configured to obtain information from individual ones of one or more other vehicles 130. The information may include one or more of experience information, updated experience information, trip information, and/or other information. In some implementations, the virtual content presented to user in vehicle 101 may include virtual content reflecting prior user interaction by other users of other vehicles (e.g., as conveyed by updated experience information received form the other vehicles).

In some implementations, communication component 114 may be configured to obtain trip information from one or more other vehicles 130. By way of non-limiting illustration, the communication component 114 may obtain trip information from a second vehicle. The trip information may convey a planned trip of the second vehicle. The vehicle 101 may use the trip information of another vehicle to determine if the other vehicle is planning on passing by experience location(s) associated with virtual content a user in vehicle 101 has already interacted with. This way, users may pass updated experience information to other users in other vehicles so that an experience with virtual content may be continued and/or shared with other users.

The experience component 108 may be configured to determine whether the trip of the second vehicle includes one or more expected vehicle locations that may match and/or approach one or more experience locations associated with virtual content interacted with by a user of vehicle 101 and/or other users of other vehicles.

The communication component 114 may be configured to, responsive to determining the trip of the second vehicle includes an experience location associated with virtual content previously interacted with by a user of vehicle 101, effectuate communication of updated experience information from the vehicle 101 to the second vehicle. The updated experience information may reflect prior interaction by the user of the vehicle 101 with the virtual content previously interacted with by the user. In this manner, a user of the second vehicle may interact with content previously interacted with by the user once the second vehicle is at or near the experience location associated with that content.

Figure 4:
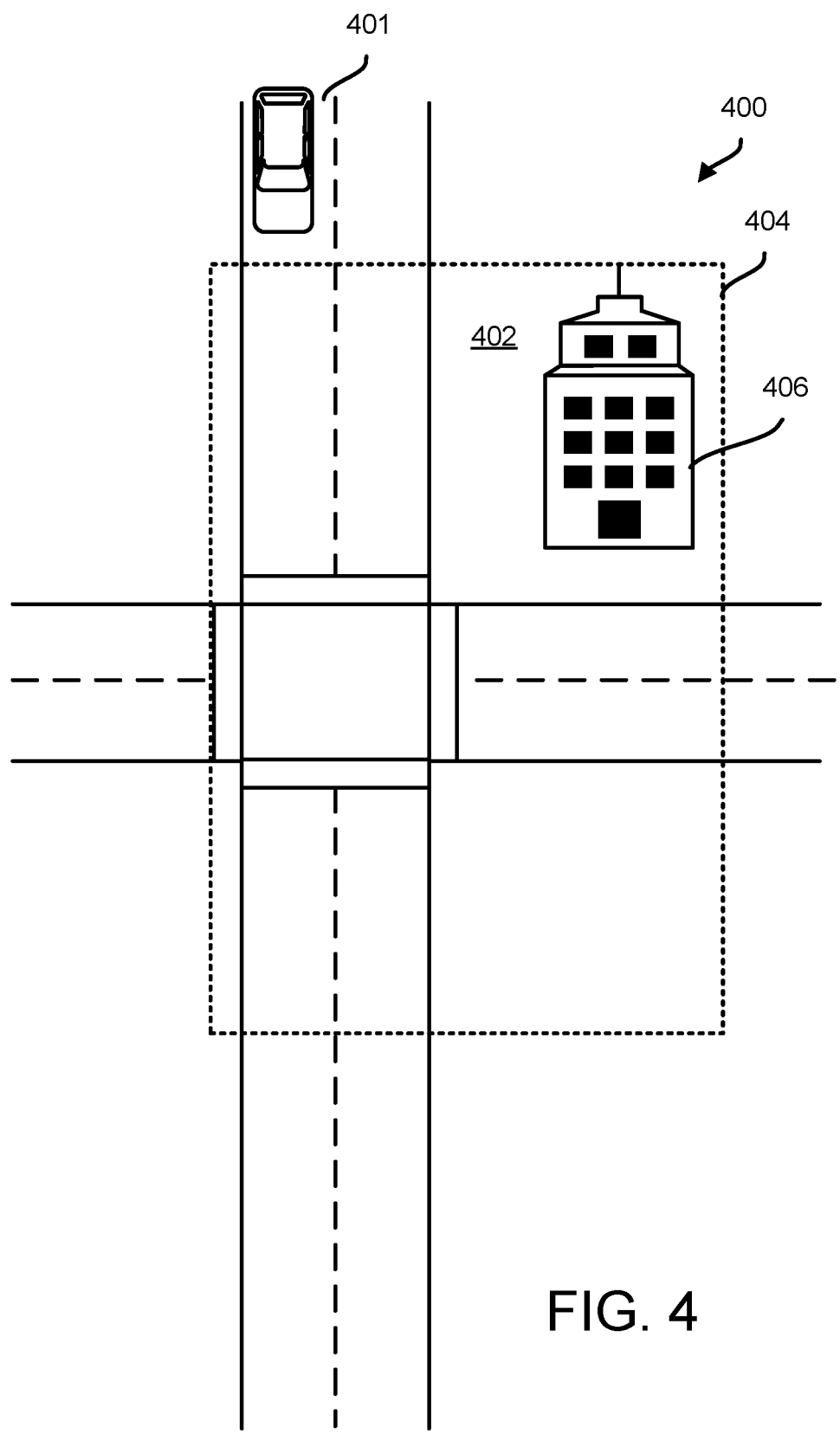
FIG. 4 shows a view of an interactive space, in accordance with one or more implementations.

FIG. 4 shows a view of an interactive space 400, in accordance with one or more implementations of the system 100 of FIG. 1. The interactive space 400 may include one or more of a vehicle 401, one or more users present within the vehicle 401, an experience location 402 in a real-world environment, and/or other component. The experience location 402 may include one or more real-world objects such as a building 406. The experience location 402 may include a geofence 404.

The vehicle 401 may store experience information and/or other information. The experience information may define virtual content to be presented to user(s) residing in the vehicle 401 to create the interactive space 400. The virtual content may be associated with the experience location 402.

Figure 5:
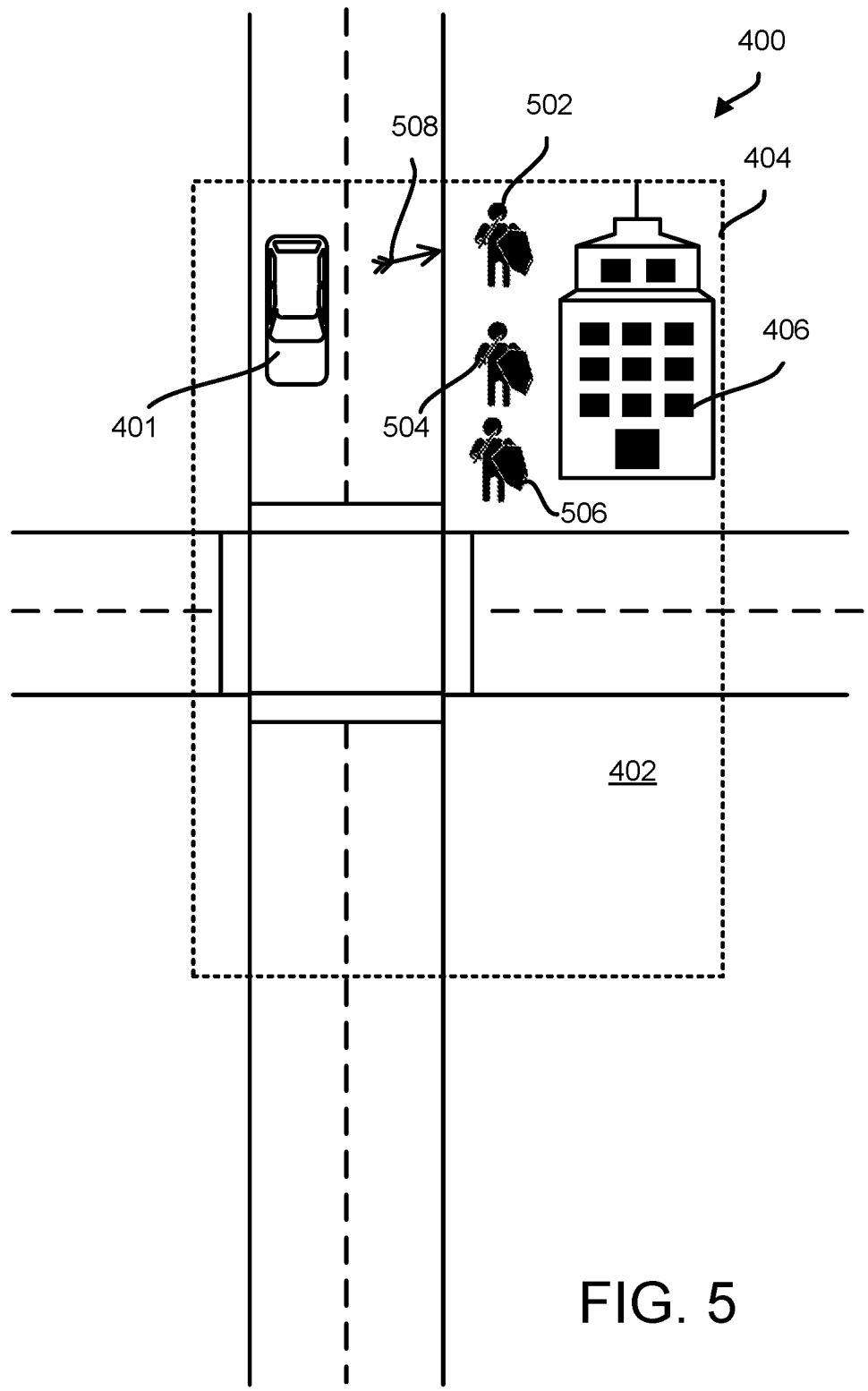
FIG. 5 shows a view of an interactive space, in accordance with one or more implementations.

FIG. 5 shows another view of the interactive space 400, in accordance with one or more implementations. Responsive to a vehicle location of the vehicle 401 being at or near the experience location 402, images of the virtual content may be presented on individual client devices of users in vehicle 401. The virtual content may include, for example, a first virtual object 502, a second virtual object 504, a third virtual object 506, and/or other virtual content. In the context of gameplay, the virtual content may include game entities with which users may engage in virtual battle with. By way of non-limiting illustration, a user may attack 508 the first virtual object 502. The vehicle 401 may update the experience information to reflect the user interaction.

Figure 6:
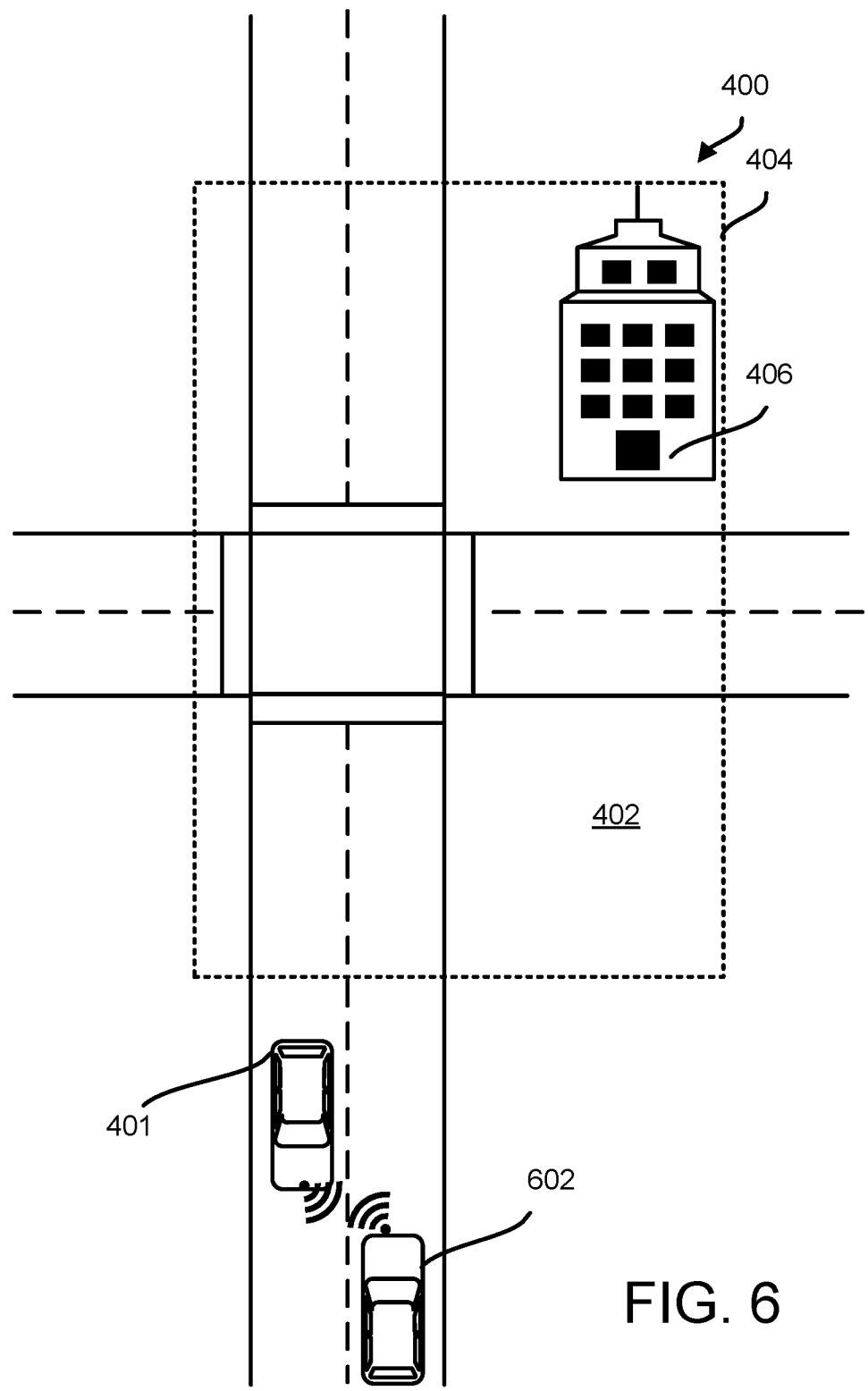
FIG. 6 shows a view of an interactive space, in accordance with one or more implementations.

FIG. 6 shows another view of the interactive space 400, in accordance with one or more implementations. The interactive space 400 may include a second vehicle 602 and/or other components. The vehicle 401 may detect presence of the second vehicle 602. The vehicle 401 may effectuate communication of the experience information updated experience information from the vehicle 401 to the second vehicle 602.

Figure 7:
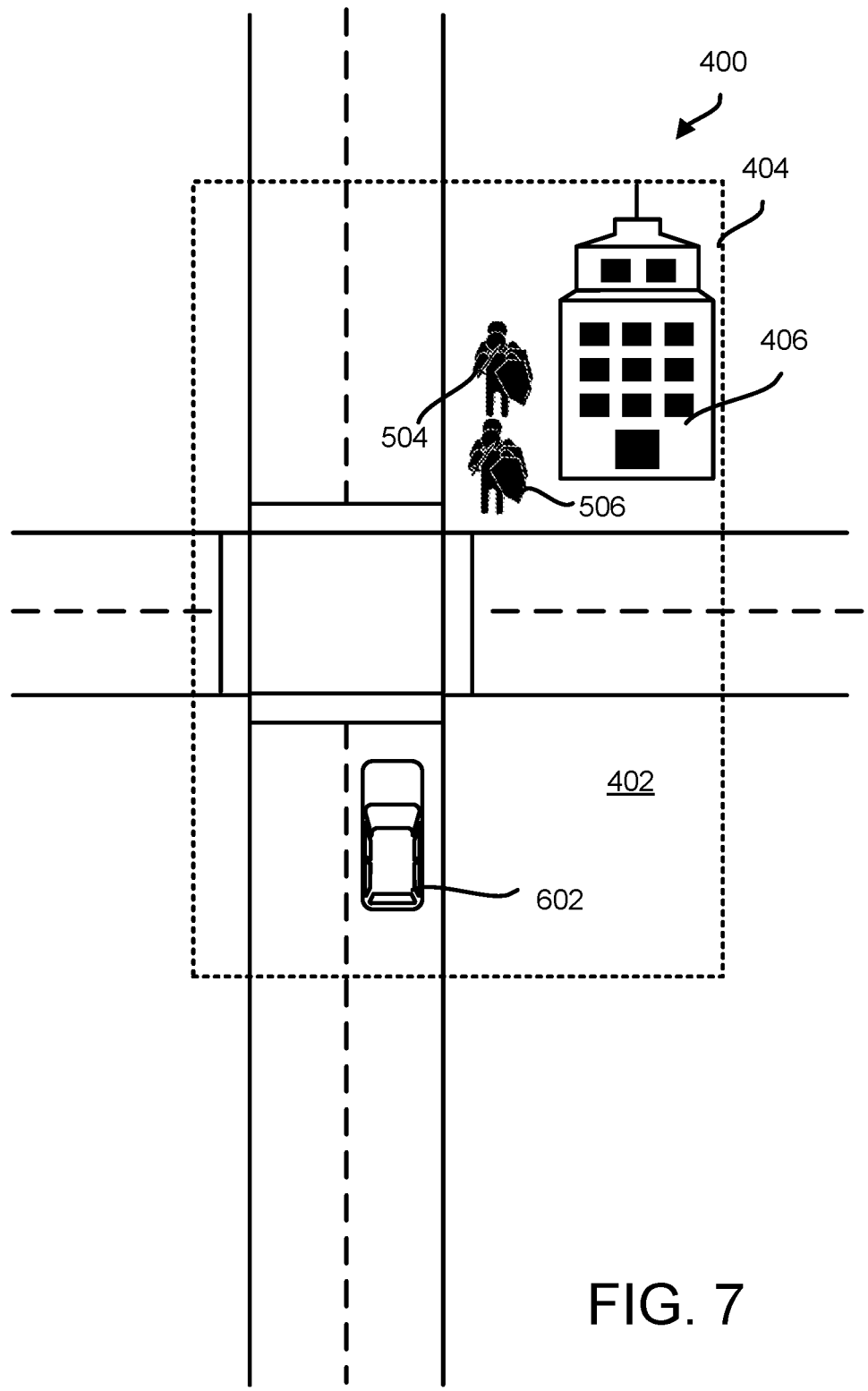
FIG. 7 shows a view of an interactive space, in accordance with one or more implementations.

FIG. 7 shows yet another view of the interactive space 400, in accordance with one or more implementations. The second vehicle 602 may obtain the updated experience information from the vehicle 401. The updated experience information may reflect the prior user interaction by the user(s) in vehicle 401. Responsive to a vehicle location of second vehicle 602 being at or near the experience location 402, images of the virtual content may be presented on client device(s) associated with the user(s) in second vehicle 602. For example, the virtual content may include second virtual object 504, third virtual object 506, and/or other virtual content. The virtual content may reflect that the first virtual object (not shown in FIG. 7) may have been defeated by the user(s) in vehicle 401.

It is noted that the depictions and corresponding descriptions for FIGS. 4-7 are for illustrative purposes only and are not to be considered limiting. For example, virtual objects may be expressed in other ways, an experience may include other types of gameplay and/or narratives, and/or other changes may be made within the scope of this disclosure. By way of non-limiting illustration, a simulated space may comprise a virtual space including narrative depicting one or more of scenes, sets, characters, and/or other content of a story.

Returning to FIG. 1, although one or more physical processors 104, one or more vehicle sensors 103, client device 102, electronic storage 117, and external resource(s) 128, are shown to be connected to network(s) 118 in FIG. 1, any communication medium may be used to facilitate interaction between any components of system 100. One or more components of system 100 may communicate through hardwired communication, wireless communication, or both. For example, one or more physical processors 104 may wirelessly communicate with one or more vehicle sensors 103 and/or client device 102. Wireless communication may include one or more of radio communication, Bluetooth communication, Wi-Fi communication, cellular communication, infrared communication, and/or other wireless communication. In some implementations, one or more physical processors 120 of client device may include the same or similar machine-readable instructions as machine-readable instructions 106 of one or more physical processors 104.

Although one or more physical processors 104 is/are shown in FIG. 1 as a single entity, this is for illustrative purposes only. In some implementations, one or more physical processors 104 may comprise a plurality of processing units. These processing units may be physically located within the same device, or one or more physical processors 104 may represent processing functionality of a plurality of devices operating in coordination.

One or more physical processors 104 may be configured to execute one or more of components 108, 110, 112, 114, 116, and/or other components by software; hardware; firmware; some combination of software, hardware, and/or firmware; and/or other mechanisms for configuring processing capabilities on one or more physical processors 104. Although components 108, 110, 112, 114, and/or 116 are illustrated in FIG. 1 as being co-located within a single processing unit, in implementations in which one or more physical processors 104 comprises multiple processing units, one or more of 108, 110, 112, 114, and/or 116 may be located remotely from the other computer program components.

The description of the functionality provided by the different computer program components 108, 110, 112, 114, and/or 116 is for illustrative purposes, and is not intended to be limiting, as any of computer program components 108, 110, 112, 114, and/or 116 may provide more or less functionality than is described. For example, one or more of computer program components 108, 110, 112, 114, and/or 116 may be eliminated, and some or all of its functionality may be provided by other computer program components 108, 110, 112, 114, and/or 116. As another example, one or more physical processors 104 may be configured to execute one or more additional computer program components that may perform some or all of the functionality attributed to one or more of computer program components 108, 110, 112, 114, and/or 116.

The electronic storage media of electronic storage 117 may be provided integrally (i.e., substantially non-removable) with one or more components of system 100 and/or removable storage that is connectable to one or more components of system 100 via, for example, a port (e.g., a USB port, a Firewire port, etc.) or a drive (e.g., a disk drive, etc.). Electronic storage 117 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 117 may be a separate component within system 100, or electronic storage 117 may be provided integrally with one or more other components of system 100 (e.g., one or more physical processors 104). Although electronic storage 117 is shown in FIG. 1 as a single entity, this is for illustrative purposes only. In some implementations, electronic storage 117 may comprise a plurality of storage units. These storage units may be physically located within the same device, or electronic storage 117 may represent storage functionality of a plurality of devices operating in coordination.

The external resource(s) 128 may include sources of information, hosts, external entities participating with system 100, providers of virtual content, and/or other resources. In some implementations, some or all of the functionality attributed herein to external resource(s) 128 may be provided by resources included in system 100.

Figure 2:
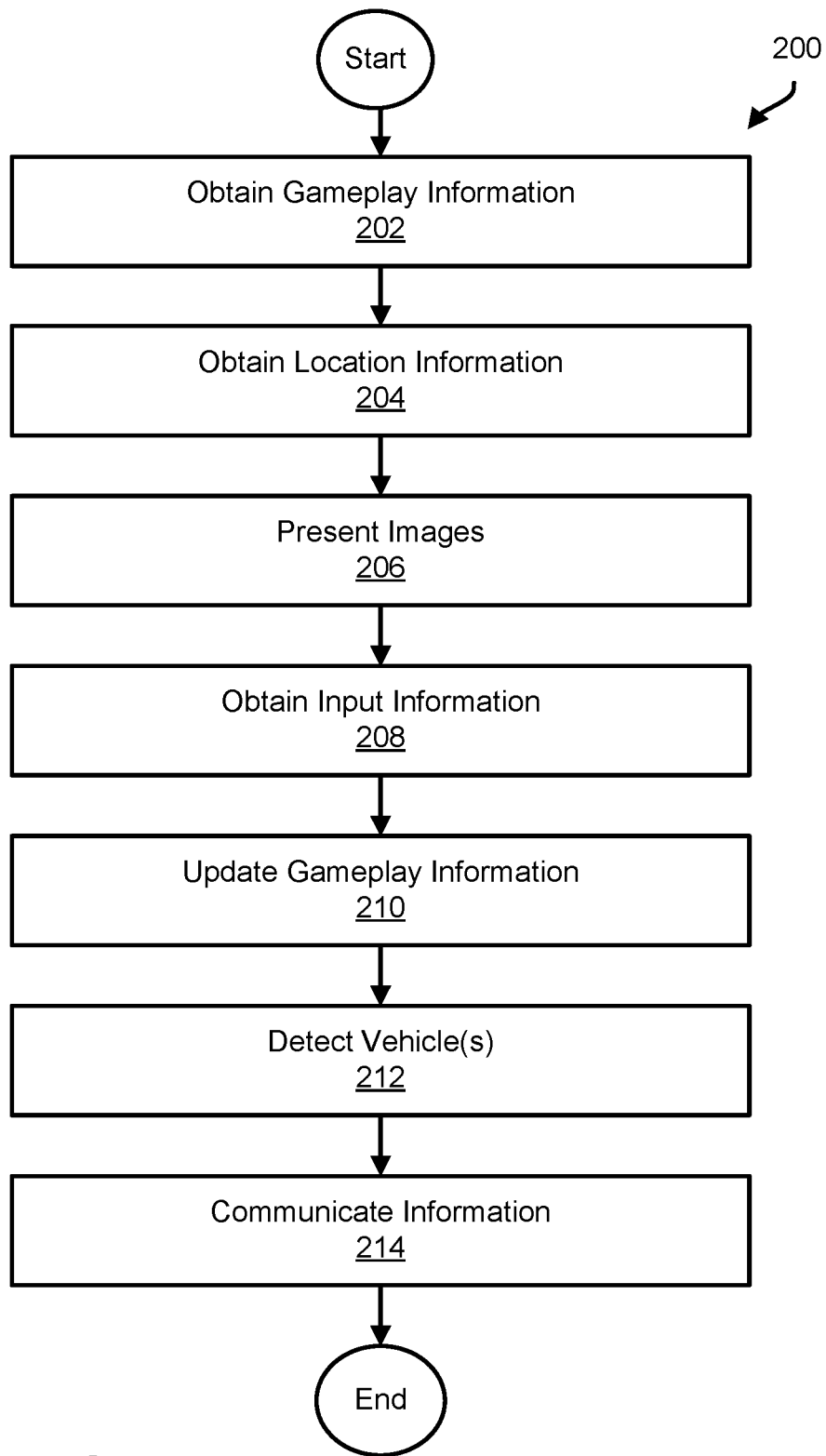
FIG. 2 illustrates a method to provide an interactive space based on vehicle-to-vehicle communications, in accordance with one or more implementations.

FIG. 2 illustrates method 200 of providing an interactive space based on vehicle-to-vehicle communications. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in a system including a vehicle, one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information), one or more client devices, and/or other components. The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 202, experience information and/or other information may be obtained. The experience information may define virtual content to be presented to a user residing in the vehicle to create an interactive space. The virtual content may be associated with an experience location in a real-world environment. In some implementations, operation 202 may be performed by a processor component the same as or similar to experience component 108 (shown in FIG. 1 and described herein).

At operation 204, location information and/or other information may be obtained. The location information may convey vehicle location of the vehicle in the real-world environment. In some implementations, operation 204 may be performed by a processor component the same as or similar to location component 110 (shown in FIG. 1 and described herein).

At operation 206, responsive to the vehicle location being at or near the gameplay location, presentation may be effectuated of images of the virtual content on a client device associated with the user. In some implementations, operation 206 may be performed by a processor component the same as or similar to presentation component 112 (shown in FIG. 1 and described herein).

At operation 208, input information and/or other information may be obtained. The input information may convey user input via the client device. The user input may reflect user interaction with the virtual content. In some implementations, operation 208 may be performed by a processor component the same as or similar to input component 116 (shown in FIG. 1 and described herein).

At operation 210, gameplay information may be updated based on the input information and/or other information. In some implementations, operation 210 may be performed by a processor component the same as or similar to input component 116 (shown in FIG. 1 and described herein).

At operation 212, presence of one or more vehicles may be detected. The one or more vehicles may include a second vehicle. In some implementations, operation 212 may be performed by a processor component the same as or similar to communication component 114 (shown in FIG. 1 and described herein).

At operation 214, communication may be effectuated of the experience information from the vehicle to the second vehicle. In some implementations, operation 214 may be performed by a processor component the same as or similar to communication component 114 (shown in FIG. 1 and described herein).

Figure 3:
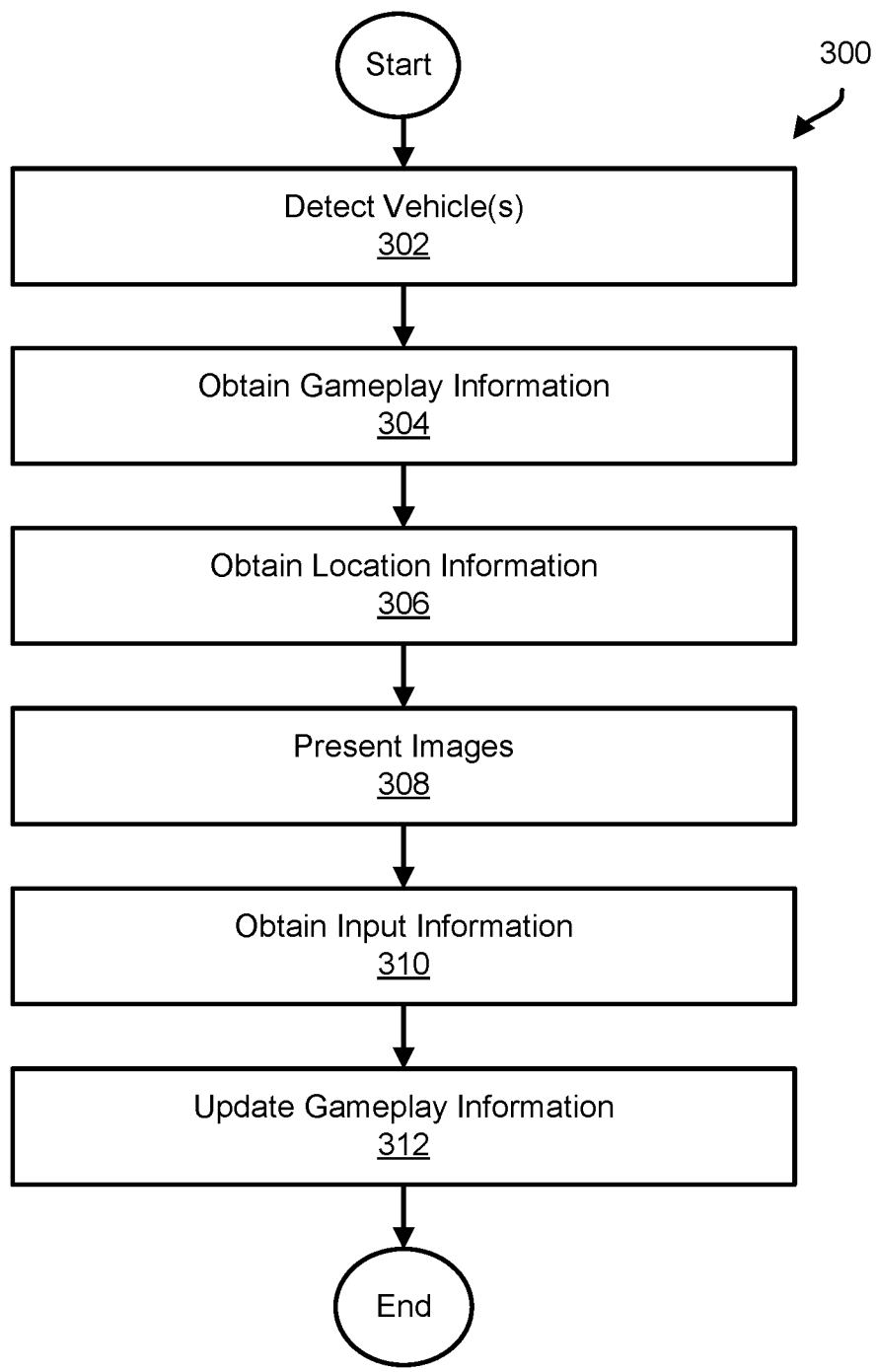
FIG. 3 illustrates a method to provide an interactive space based on vehicle-to-vehicle communications, in accordance with one or more implementations.

FIG. 3 illustrates method 300 of providing an interactive space based on vehicle-to-vehicle communications. The operations of method 300 presented below are intended to be illustrative. In some implementations, method 300 may be accomplished with one or more additional operations not described, and/or without one or more of the operations discussed. In some implementations, two or more of the operations may occur substantially simultaneously.

In some implementations, method 300 may be implemented in a system including a vehicle, one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information), one or more client devices, and/or other components. The one or more processing devices may include one or more devices executing some or all of the operations of method 300 in response to instructions stored electronically on one or more electronic storage mediums. The one or more processing devices may include one or more devices configured through hardware, firmware, and/or software to be specifically designed for execution of one or more of the operations of method 300.

Referring to FIG. 3 and method 300, at operation 302, presence of one or more vehicles may be detected. The one or more vehicles may include a second vehicle. In some implementations, operation 302 may be performed by a processor component the same as or similar to communication component 114 (shown in FIG. 1 and described herein)

At operation 304, experience information and/or other information may be obtained. The experience information may define virtual content to be presented to a user residing in the vehicle to create an interactive space. The virtual content may be associated with an experience location in a real-world environment. The virtual content may reflect prior user interaction by a second user with the virtual content. In some implementations, operation 304 may be performed by a processor component the same as or similar to experience component 108 (shown in FIG. 1 and described herein).

At operation 306, location information and/or other information may be obtained. The location information may convey vehicle location of the vehicle in the real-world environment. In some implementations, operation 306 may be performed by a processor component the same as or similar to location component 110 (shown in FIG. 1 and described herein).

At operation 308, responsive to the vehicle location being at or near the experience location, presentation may be effectuated of images of the virtual content on a client device associated with the user. In some implementations, operation 308 may be performed by a processor component the same as or similar to presentation component 112 (shown in FIG. 1 and described herein).

At an operation 310, input information and/or other information may be obtained. The input information may convey user input via the client device. The user input may reflect user interaction with the virtual content. In some implementations, operation 310 may be performed by a processor component the same as or similar to input component 116 (shown in FIG. 1 and described herein).

At operation 312, experience information may be updated based on the input information and/or other information. In some implementations, operation 312 may be performed by a processor component the same as or similar to input component 116 (shown in FIG. 1 and described herein).

Although the system(s) and/or method(s) of this disclosure have been described in detail for the purpose of illustration based on what is currently considered to be the most practical and preferred implementations, such detail is solely for that purpose and that the disclosure is not limited to the disclosed implementations, but, on the contrary, is intended to cover modifications and equivalent arrangements that are within the spirit and scope of the appended claims. The present disclosure contemplates that, to the extent possible, one or more features of any implementation can be combined with one or more features of any other implementation.

What is claimed is:

1. A system configured to provide an interactive space based on vehicle-to-vehicle communications, the system being coupled to a vehicle, the system comprising:
non-transitory electronic storage storing experience information, the experience information defining virtual content to be presented to a user residing in the vehicle to create an interactive space, the virtual content being associated with an experience location in a real-world environment;
one or more physical processors configured by machine readable instructions to:
obtain location information, the location information conveying vehicle location of the vehicle in the real-world environment;
responsive to the vehicle location being at or near the experience location, effectuate presentation of images of the virtual content on a client device associated with the user;
obtain input information conveying user input via the client device, the user input reflecting user interaction with the virtual content;
update the experience information based on the input information;
detect presence of a second vehicle;
effectuate communication of the experience information from the vehicle to the second vehicle;
obtain trip information from the second vehicle, the trip information including a planned trip of the second vehicle;
determine whether the trip of the second vehicle includes the experience location; and
responsive to determining the trip of the second vehicle includes the experience location, effectuate communication of the experience information from the vehicle to the second vehicle.

2. The system of claim 1, wherein being at or near the experience location is defined by a geo-fence around the experience location.

3. The system of claim 1, wherein communication of the experience information from the vehicle to the second vehicle is direct vehicle-to-vehicle communication.

4. The system of claim 1, wherein the client device is a headset configured to be worn on a head of the user.

5. A system configured to provide an interactive space based on vehicle-to-vehicle communications, the system being coupled to a vehicle, the system comprising:
one or more physical processors configured by machine readable instructions to:
detect presence of a second vehicle;
obtain experience information from the second vehicle, the experience information defining virtual content to be presented to a user residing in a vehicle to create an interactive space, the virtual content being associated with an experience location in a real-world environment, the virtual content reflecting prior user interaction by a second user with the virtual content;
obtain location information, the location information conveying vehicle location of the vehicle in the real-world environment;
responsive to the vehicle location being at or near the experience location, effectuate presentation of images of the virtual content on a client device associated with the user;
obtain input information conveying user input via the client device, the user input reflecting user interaction with the virtual content;
update the experience information based on the input information;
in response to detecting presence of the second vehicle, effectuate communication of trip information to the second vehicle, the trip information including a planned trip of the vehicle.

6. The system of claim 5, wherein obtaining the experience information from the second vehicle and communicating the trip information to the second vehicle is based on direct vehicle-to-vehicle communication.

7. The system of claim 5, wherein being at or near the experience location is defined by a geo-fence around the experience location.

8. The system of claim 5, wherein the one or more physical processors are further configured by the machine-readable instructions to:
detect presence of a third vehicle; and
effectuate communication of the experience information from the vehicle to a third vehicle.

9. A method to provide an interactive space based on vehicle-to-vehicle communications, the method comprising:
obtaining, at a vehicle, experience information, the experience information defining virtual content to be presented to a user residing in the vehicle to create an interactive space, the virtual content being associated with an experience location in a real-world environment;
obtaining location information, the location information conveying vehicle location of the vehicle in the real-world environment;
responsive to the vehicle location being at or near the experience location, presenting of images of the virtual content on a client device associated with the user;
obtaining input information conveying user input via the client device, the user input reflecting user interaction with the virtual content;
updating the experience information based on the input information;
detecting, by the vehicle, presence of a second vehicle;
communicating the experience information from the vehicle to the second vehicle;
obtaining trip information from the second vehicle, the trip information including a planned trip of the second vehicle;
determining whether the trip of the second vehicle includes the experience location; and
responsive to determining the trip of the second vehicle includes the experience location, communicating the experience information from the vehicle to the second vehicle.

10. The method of claim 9, wherein being at or near the experience location is defined by a geo-fence around the experience location.

11. The method of claim 9, wherein communication of the experience information from the vehicle to the second vehicle is direct vehicle-to-vehicle communication.

12. The method of claim 9, wherein the client device is a headset configured to be worn on a head of the user.

13. A method configured to provide an interactive space based on vehicle-to-vehicle communications, the method comprising:

detecting, by a vehicle, presence of a second vehicle;

obtaining, at the vehicle, experience information from the second vehicle, the experience information defining virtual content to be presented to a user residing in the vehicle to create an interactive space, the virtual content being associated with an experience location in a real-world environment, the virtual content reflecting prior user interaction by a second user with the virtual content;

obtaining location information, the location information conveying vehicle location of the vehicle in the real-world environment;

responsive to the vehicle location being at or near the experience location, presenting images of the virtual content on a client device associated with the user;

obtaining input information conveying user input via the client device, the user input reflecting user interaction with the virtual content;

updating the experience information based on the input information;

in response to detecting presence of the second vehicle, communicating trip information from the vehicle to the second vehicle, the trip information including a planned trip of the vehicle.

14. The method of claim 13, wherein obtaining the experience information from the second vehicle and communicating the trip information to the second vehicle is based on direct vehicle-to-vehicle communication.

15. The method of claim 13, wherein being at or near the experience location is defined by a geo-fence around the experience location.

16. The method of claim 13, wherein the method further comprises:

detecting presence of a third vehicle; and communicating the experience information from the vehicle to a third vehicle.

\* \* \* \* \*